United States Patent
Matsumura et al.

(10) Patent No.: US 8,559,136 B1
(45) Date of Patent: Oct. 15, 2013

(54) HARD AMORPHOUS CARBON FILM CONTAINING ULTRATRACE HYDROGEN FOR MAGNETIC RECORDING MEDIA AND MAGNETIC HEADS

(71) Applicant: HGST Netherlands B.V., Luna ArenA (NL)

(72) Inventors: Toru Matsumura, Chigasaki (JP); Hiroshi Inaba, Yokohama (JP); Hiroyuki Matsumoto, Chigasaki (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/677,252

(22) Filed: Nov. 14, 2012

(51) Int. Cl.
*G11B 5/72* (2006.01)
*G11B 5/66* (2006.01)
*G11B 5/82* (2006.01)

(52) U.S. Cl.
USPC ............ 360/135; 428/833.2; 29/603.14

(58) Field of Classification Search
USPC ............ 360/97.11, 122, 135, 235.4; 428/829, 428/833.2, 834; 29/603.14
See application file for complete search history.

(56) References Cited

U.S. PATENT DOCUMENTS

| | | | |
|---|---|---|---|
| 5,734,519 A * | 3/1998 | Fontana et al. | 360/99.19 |
| 6,740,384 B2 * | 5/2004 | Veerasamy et al. | 428/835 |
| 7,175,926 B2 | 2/2007 | Ma et al. | |
| 7,324,305 B2 * | 1/2008 | Inomata | 360/135 |
| 7,459,763 B1 * | 12/2008 | Issaq et al. | 257/530 |
| 7,551,398 B2 * | 6/2009 | Fujimaki et al. | 360/235.4 |
| 7,826,176 B2 * | 11/2010 | Shirotori et al. | 360/135 |
| 7,931,748 B2 | 4/2011 | Veerasamy et al. | |
| 7,961,427 B2 * | 6/2011 | Dorbeck et al. | 360/97.11 |
| 2009/0291326 A1 | 11/2009 | Nagata | |
| 2010/0247962 A1 | 9/2010 | Sasaki | |

OTHER PUBLICATIONS

Tan et al., "Corrosion protection of iltra-thin ta-c films for recording slider applications at varied substrate bias," Surface and Coatings Technology, vol. 203, Issue 8, Jan. 15, 2009, pp. 963-966 (abstract only).

Akita et al., "Comparison of deposition methods for ultra thin DLC overcoat films for MR head," 2001 Elsevier Science B.V., Diamond Related Materials, vol. 10, pp. 1017-1023.

Furusawa, K., "ta-c films by filtered cathodic vacuum-arc deposition for ABSOC," IEEE International Magnetics Conference, 2002, INTERMAG Europe 2002, Digest of Technical Papers (abstract only).

* cited by examiner

*Primary Examiner* — Angel Castro
(74) *Attorney, Agent, or Firm* — Zilka-Kotab, PC

(57) ABSTRACT

A magnetic recording medium according to one embodiment includes at least a ground layer above a non-magnetic substrate; a magnetic recording layer above the ground layer; and an overcoat above the magnetic recording layer, the overcoat characterized in that said overcoat is an amorphous carbon film having a ratio of $sp^3$ bonding with respect to $sp^2$ bonding ($sp^3/(sp^2+sp^3)$) of at least 0.5, and hydrogen content in the overcoat in a center layer thereof in a film thickness direction of said overcoat is from 0.1 atom % to 0.6 atom %. Additional products and methods are also presented.

21 Claims, 11 Drawing Sheets

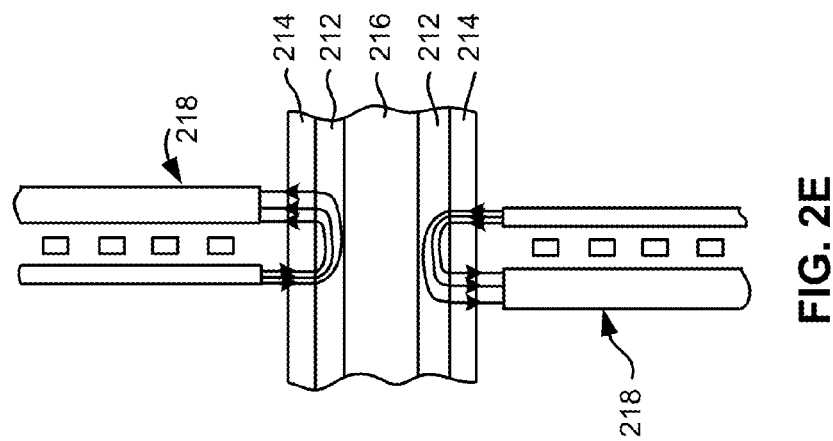
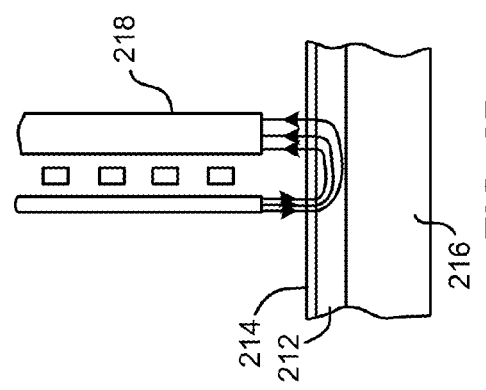
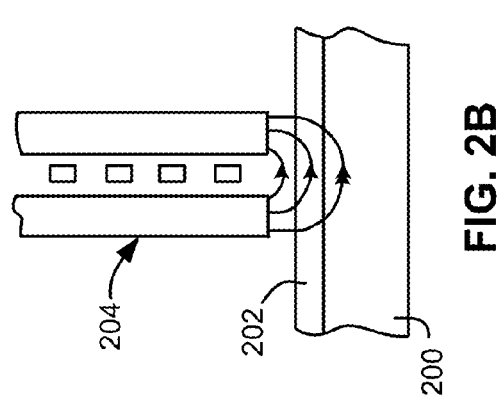
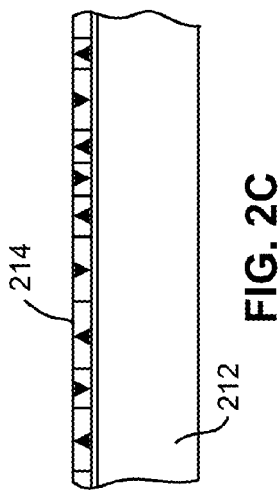
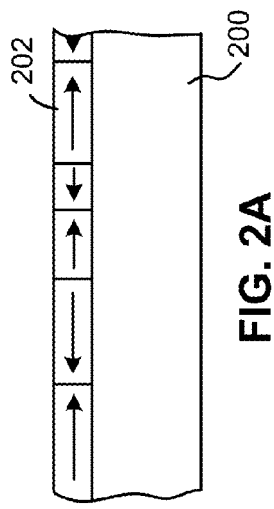

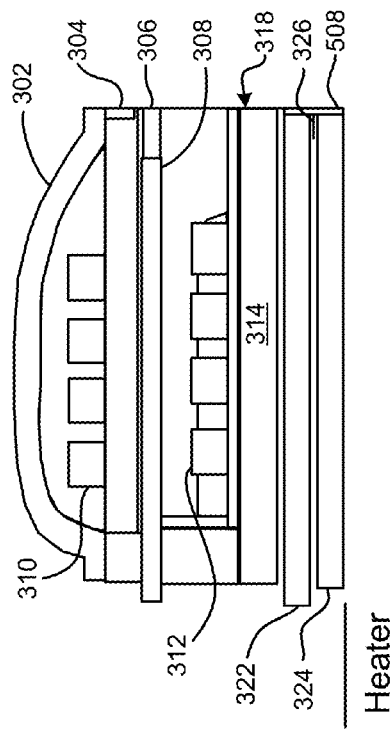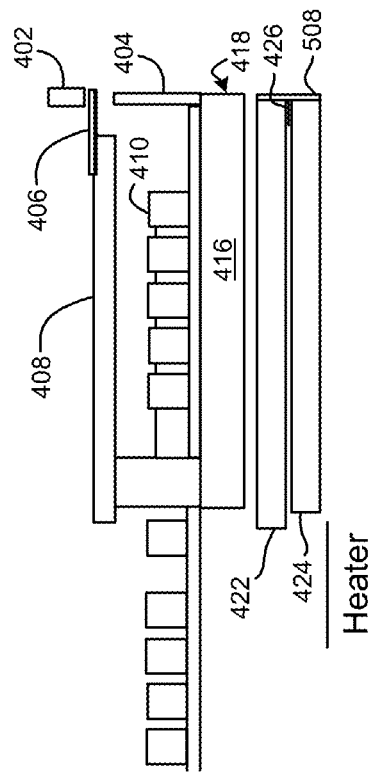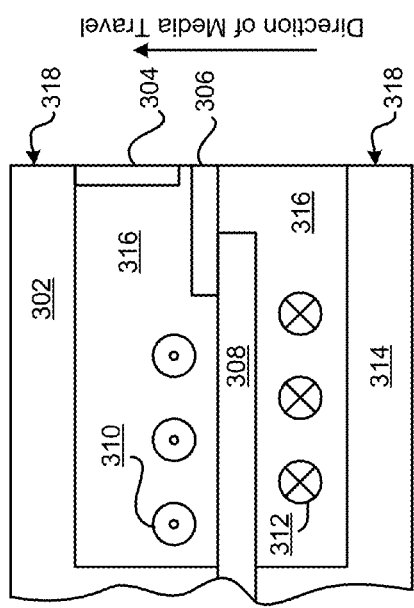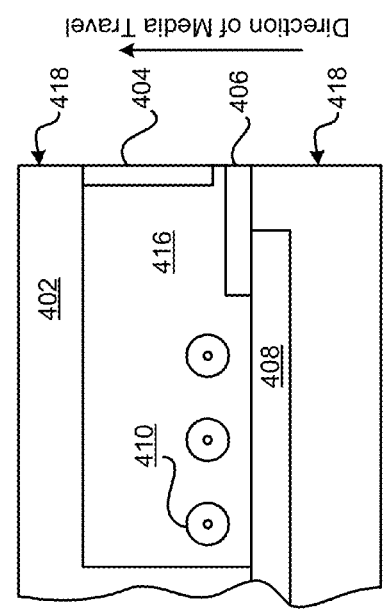
FIG. 3B
FIG. 4B
FIG. 3A
FIG. 4A

HARD AMORPHOUS CARBON FILM CONTAINING ULTRATRACE HYDROGEN FOR MAGNETIC RECORDING MEDIA AND MAGNETIC HEADS

FIELD OF THE INVENTION

The present invention relates to data storage systems, and more particularly, this invention relates to various components of magnetic storage systems having a superhard amorphous carbon film thereon, and methods of forming the same.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles.

As described above, a magnetic disk drive uses a magnetic head to record and play back the information on a magnetic disk (magnetic recording medium). As the magnetic spacing becomes smaller, the magnetic head and the magnetic disk can be closer, and information can be recorded in microscopic regions, and the minute magnetic signals on the magnetic disk can be played back. When the head-disk spacing narrows, the film thicknesses of the overcoats of the magnetic disk and the magnetic head must be reduced.

However, in order to prevent corrosion of the metals used in the recording layer of the magnetic disk and the recording and playback element of the magnetic head, the overcoat must be chemically stable, dense, and uniform. In addition, when the magnetic head is extremely close to the magnetic disk, sufficiently high resistance to abrasion must be present because of the relative rotational motions. Moreover, generally, as conventional overcoats of the magnetic disk and the magnetic head become thinner, the corrosion resistance degrades because the coverage decreases; the effective hardness decreases; and the abrasion resistance degrades. Therefore, in order to achieve thinner overcoats for the magnetic disk and the magnetic head while maintaining corrosion resistance and abrasion resistance, the density and hardness of the overcoats of the magnetic disk and the magnetic head must be improved, and the degradation caused by the thinner film thickness must be corrected.

In order to improve the recording density, suppression of thermal demagnetization of the recording medium and maintenance of the write characteristics should be simultaneously satisfied. The bit diameter of the recording medium should also be on the order of nanobits in order to achieve a high recording density. However, the problem of thermal demagnetization arises as the bit diameter decreases.

Information recorded on the recording medium is lost as time elapses because of fluctuations in the thermal magnetization, which cause thermal demagnetization. To solve the problem of thermal demagnetization, the thermal stability of the magnetization may be improved by using a material having high magnetic anisotropy. However, when the magnetic anisotropy becomes too high, the magnetization of the recording medium cannot be reversed by the recording magnetic field from the magnetic head recording element, and consequently, the magnetic medium is no longer able to be written to.

Specifically, to improve the surface recording density, new technologies are indispensable to simultaneously achieve the suppression of thermal demagnetization and the maintenance of the writing characteristics to the recording medium. One proposed method for solving this problem is thermally assisted recording (TAR). In this technology, magnetic recording is conducted while the coercive force is decreased by temporarily and locally heating the recording medium. By using this technology, writing is possible even for a recording medium having high magnetic anisotropy. As a result, the suppression of thermal demagnetization and the maintenance of the characteristics of writing to the recording medium are satisfied simultaneously, and a dramatic increase in the surface recording density can be realized. Consequently, thermal resistance becomes necessary for the overcoats of the magnetic disk and the magnetic head.

In particular, the development of technologies for improving the thermal resistance of the head-disk interface (HDI) is essential in producing a practical TAR method. A conventional HDI is composed of a magnetic head overcoat, a magnetic disk overcoat, and a lubricant film, each of which plays a role in preventing corrosion and abrasion of the head and disk, and maintaining high reliability of the magnetic disk drive. However, the structural elements of the HDI have carbon as the primary component and are believed to be susceptible to heat compared to metals or ceramics. Therefore, in the high temperature environment of TAR, the HDI structural elements are typically deformed and/or degraded by heat. As a result, degradation and deformation are concerns in the reliability of the magnetic recording system.

Conventional diamond-like carbon (DLC) films have been used as the disk overcoats of the HDI structural elements. However, in a high temperature environment considering the application to TAR, the mechanical resistance and chemical resistance required as the distance between the head and disk narrows must also be thermally stable for desirable results. Therefore, a property of the desired DLC film is an overcoat having high film density, that is, enhanced $sp^3$ bonding (e.g., a diamond structure).

However, DLC films produced by a conventional sputtering method have a structure close to that of graphite, thereby having few $sp^3$ bonds. Moreover, a DLC film formed by chemical vapor deposition (CVD) includes hydrogen in the film because a hydrocarbon gas is used as a raw material, but it is difficult to achieve a high $sp^3$ bonding ratio via this method.

As described above, in order to achieve a higher recording density in magnetic disk drives, the demands for the overcoats of the magnetic disk and the magnetic head are a thinner shape and higher thermal resistance. To ensure higher reliability as a magnetic disk drive, higher density, hardness, and higher thermal resistance are desirable.

Thus it would be beneficial to develop a system with high recording density by improving the corrosion resistance and abrasion resistance in order to produce thinner films. Moreover it may be beneficial to improve the heat resistance in order to improve the practicality of implementing TAR.

SUMMARY

A magnetic recording medium according to one embodiment includes at least a ground layer above a non-magnetic substrate; a magnetic recording layer above the ground layer; and an overcoat above the magnetic recording layer, the overcoat characterized in that said overcoat is an amorphous carbon film having a ratio of $sp^3$ bonding with respect to $sp^2$ bonding ($sp^3/(sp^2+sp^3)$) of at least 0.5, and hydrogen content in the overcoat in a center layer thereof in a film thickness direction of said overcoat is from 0.1 atom % to 0.6 atom %.

A magnetic head according to another embodiment includes a playback element; and an overcoat above a media-facing side of the playback element, the overcoat characterized in that said overcoat is an amorphous carbon film having a ratio of $sp^3$ bonding with respect to $sp^2$ bonding ($sp^3/(sp^2+sp^3)$) of at least 0.5, and hydrogen content in the film in a center layer in a film thickness direction of said overcoat is from 0.1 atom % to 0.6 atom %.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

A method according to yet another embodiment includes forming an overcoat above at least one of a magnetic layer of a magnetic medium and a media-facing side of the playback element, the overcoat characterized in that said overcoat is an amorphous carbon film having a ratio of $sp^3$ bonding with respect to $sp^2$ ($sp^3/(sp^2+sp^3)$) bonding of at least 0.5, and hydrogen content in the film in a center layer in a film thickness direction of said overcoat is in a range of from 0.1 atom % to 0.6 atom %, wherein the hydrogen content of said overcoat is adjusted to be in said range by adjusting a flow of hydrogen gas into a film deposition chamber during deposition of the overcoat, and by adjusting a hydrogen gas pressure in said film deposition chamber.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
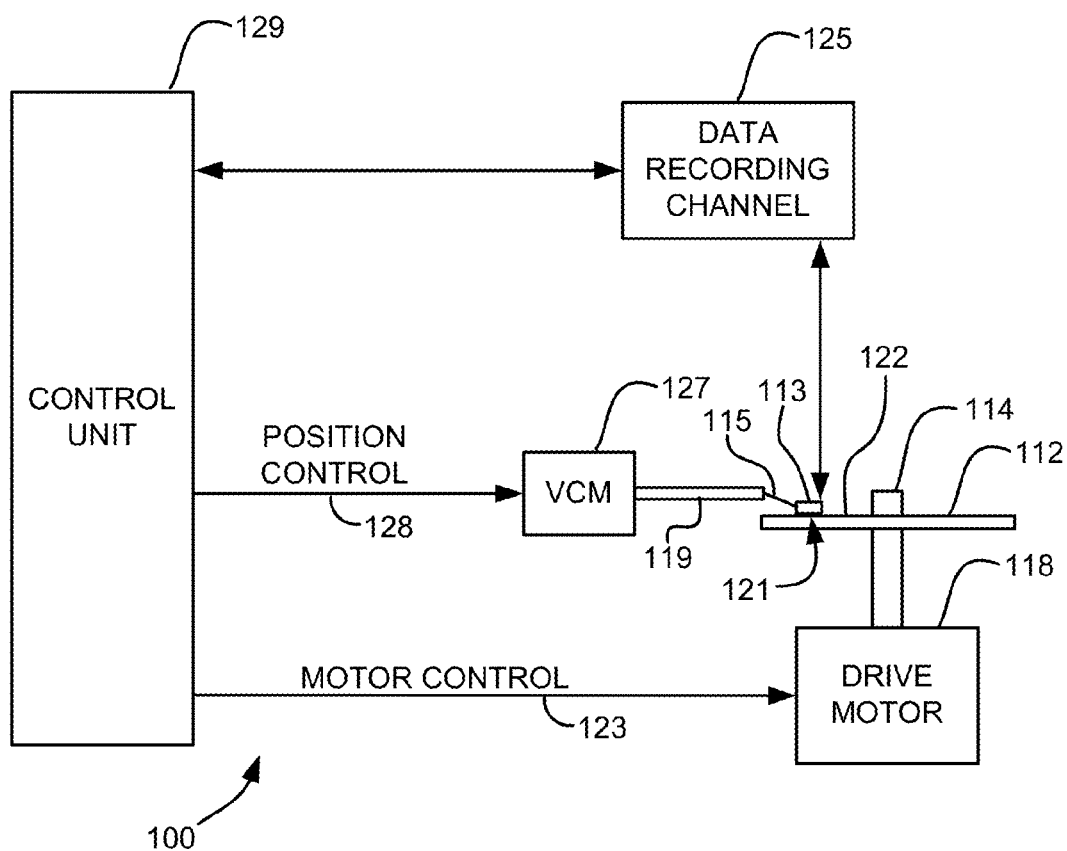
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic recording medium includes at least a ground layer above a non-magnetic substrate; a magnetic recording layer above the ground layer; and an overcoat above the magnetic recording layer, the overcoat characterized in that said overcoat is an amorphous carbon film having a ratio of $sp^3$ bonding with respect to $sp^2$ bonding ($sp^3/(sp^2+sp^3)$) of at least 0.5, and hydrogen content in the overcoat in a center layer thereof in a film thickness direction of said overcoat is from 0.1 atom % to 0.6 atom %.

In another general embodiment, a magnetic head includes a playback element; and an overcoat above a media-facing side of the playback element, the overcoat characterized in that said overcoat is an amorphous carbon film having a ratio of $sp^3$ bonding with respect to $sp^2$ bonding ($sp^3/(sp^2+sp^3)$) of at least 0.5, and hydrogen content in the film in a center layer in a film thickness direction of said overcoat is from 0.1 atom % to 0.6 atom %.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

In one general embodiment, a method includes forming an overcoat above at least one of a magnetic layer of a magnetic medium and a media-facing side of the playback element, the overcoat characterized in that said overcoat is an amorphous carbon film having a ratio of $sp^3$ bonding with respect to $sp^2$ ($sp^3/(sp^2+sp^3)$) bonding of at least 0.5, and hydrogen content in the film in a center layer in a film thickness direction of said overcoat is in a range of from 0.1 atom % to 0.6 atom %, wherein the hydrogen content of said overcoat is adjusted to be in said range by adjusting a flow of hydrogen gas into a film deposition chamber during deposition of the overcoat, and by adjusting a hydrogen gas pressure in said film deposition chamber.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324. The sensor 326 may also have an overcoat 508 positioned thereabove (explained in further detail below). The overcoat 508 may be positioned above the media facing side of other portions of the head as well.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424. The sensor 426 may also have an overcoat 508 positioned thereabove (explained in further detail below). The overcoat 508 may be positioned above the media facing side of other portions of the head as well.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Various embodiments described and/or suggested herein may provide a structure and/or method for improving the film density, film height, and thermal resistance of an amorphous carbon overcoat, also referred to herein as a superhard amorphous carbon overcoat. Moreover, the embodiments described and/or suggested herein may preferably reduce the film thickness of the overcoats of the magnetic disk and the magnetic head. Furthermore, embodiments of the protective layers disclosed herein provide high thermal stability even in thermally-assisted magnetic recording systems, thereby enabling a higher recording density because of their higher reliability.

The superhard amorphous carbon overcoats according to various embodiments may be formed by film deposition, while supplying an extremely small amount of hydrogen, thereby introducing an extremely small amount of hydrogen into the film. In contrast to conventional methods which essentially contain no hydrogen, a carbon film having hydrogen content in a preferred range has been found to be ideal for improving the reliability of the magnetic recording medium and/or the magnetic head because the film density is improved in some embodiments by up to 20% or more, the film height is improved by at least 10%, and the thermal resistance is improved.

Figure 5:
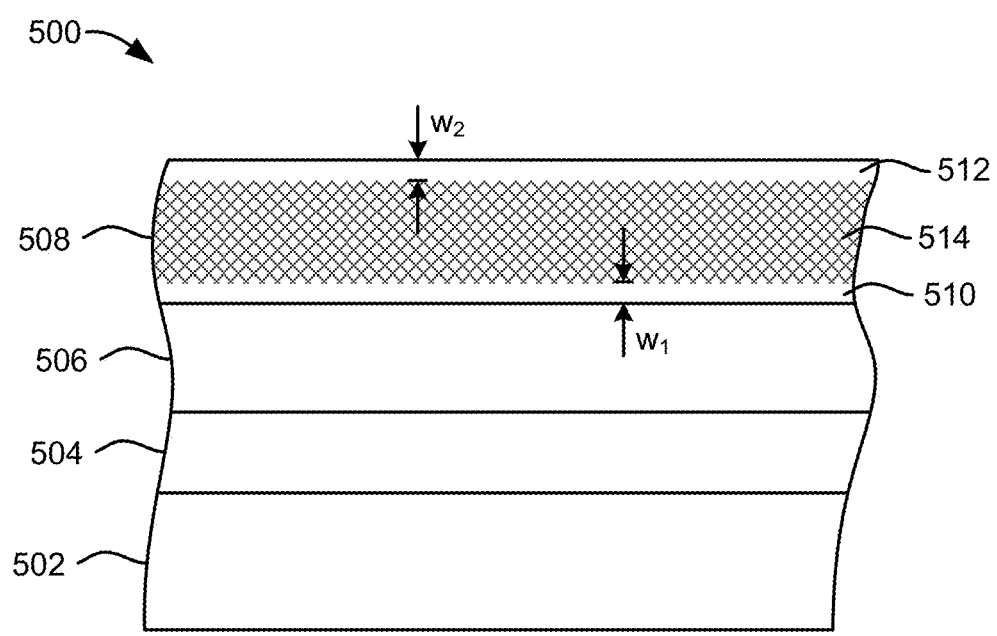
FIG. 5 is a partial cross-sectional view of a magnetic recording medium according to one embodiment.

FIG. 5 depicts a magnetic recording medium 500, in accordance with one embodiment. As an option, the present magnetic recording medium 500 may be implemented in conjunction with features from any other embodiment listed herein, such as those described with reference to the other FIGS. Of course, however, such magnetic recording medium 500 and others presented herein may be used in various applications and/or in permutations which may or may not be specifically described in the illustrative embodiments listed herein. Further, the magnetic recording medium 500 presented herein may be used in any desired environment.

Referring now to FIG. 5, the magnetic recording medium 500 may be a magnetic disc or any other suitable magnetic recording medium which would be apparent to one skilled in the art. As illustrated, the magnetic recording medium 500 preferably includes at least a ground layer 504 e.g., a soft underlayer (SUL), a magnetic recording layer 506, and an overcoat 508 arranged above a non-magnetic substrate 502, but may include any number of additional layers depending on the desired embodiment.

In another embodiment, an overcoat may be an overcoat for a magnetic head, according to any approach presented herein, preferably having a playback element (also referred to herein as a sensor). In a preferred approach, the overcoat may be positioned above the media-facing side of the playback element (see 508 of FIGS. 3B and 4B). Moreover, the protective layer may be embedded in, flush with and/or forming part of, offset from, protruding above, etc. the media-facing surface of the magnetic head. In one approach, the overcoat may be an overcoat for a magnetic head having an upper shield layer, a lower shield layer, and a playback element provided between these layers. Moreover, the overcoat may be an overcoat for a recording head having a lower magnetic pole, a main magnetic pole, a shield layer, and an auxiliary magnetic pole. In another approach, the overcoat may include an air-bearing surface overcoat, which may be formed on the surface of the playback element on the side opposite the magnetic medium.

In further approaches, an overcoat may be provided on both the head and the medium.

The following description provides additional detail about various embodiments of overcoats, where such details may be generally applicable to any of the overcoats described herein, including those on a head and/or a medium.

The overcoat may be formed as an amorphous carbon film. Moreover, the amorphous carbon film may primarily be, e.g., greater than about 50 atom % (atomic percent) tetrahedral amorphous carbon, but is not limited thereto. In a preferred approach, the superhard amorphous carbon film may have a high $sp^3$ bond ratio. According to an illustrative example, the superhard amorphous carbon film may have a bonding ratio of $sp^3$ bonding with respect to $sp^2$ bonding ($sp^a/(sp^2+sp^3)$) of at least about 0.5 (preferred), but could be higher or lower depending on the desired embodiment.

With reference to FIG. 5, showing an overcoat 508 on a medium 500, and discussed here by way of example, the overcoat 508 may have at least a first layer 510, second layer 512 and center layer 514. According to various approaches, the first, second and center layers may have the same, similar, different, etc. compositions, or combinations thereof. Moreover, the first, center, and second layer may be discrete layers; may all be part of a continuously-formed overcoat layer where deposition conditions are varied to create a center layer having a different characteristic than an adjacent one of the layers; and combinations thereof.

In a particularly preferred approach, the first and second layers of the overcoat may have a composition different than the center layer of the overcoat.

As illustrated in FIG. 5, the center layer 514 of the overcoat may be defined between the first layer 510 and the second layer 512 thereof. The first layer 510 may have a width $w_1$ of at least 0.5 nm in the film thickness direction from a side of the center layer closest the recording layer in the film thickness direction. Furthermore, the second layer may have a width $w_2$ of at least 0.5 nm in the film thickness direction from a side of the center layer, opposite the first layer. The thickness of the overcoat 508 may be in a range of between 1.25 nm and 5 nm, but could be higher or lower.

The center layer of the overcoat may have a hydrogen content preferably from about 0.1 atom % to about 0.6 atom %, more preferably from about 0.2 atom % to 0.4 atom %, but may be higher or lower depending on the desired embodiment. Moreover, the center layer may have a carbon content of at least 85 atom %, more preferably 90 atom %, still more preferably 95 atom %, but could be higher or lower depending on the desired embodiment. In another approach, the average value of the hydrogen content in the film in a given region having a carbon content of at least 95 atom % in the overcoat may be specified from about 0.1 atom % to about 0.6 atom %, but could be higher or lower depending on the desired embodiment.

According to various other approaches, the mass density of a magnetic recording medium and/or a magnetic head according to any of the embodiments described herein may be determined to be from about 3.3 g/cm³ to about 3.6 g/cm³, by incorporating x-ray reflectometry. According to still other approaches, the mass density of the overcoat may be from about 3.3 g/cm³ to about 3.6 g/cm³, more preferably from about 3.53 g/cm³ to about 3.6 g/cm³ as determined by incorporating x-ray reflectometry, but could be higher or lower depending on the desired embodiment.

Figure 6:
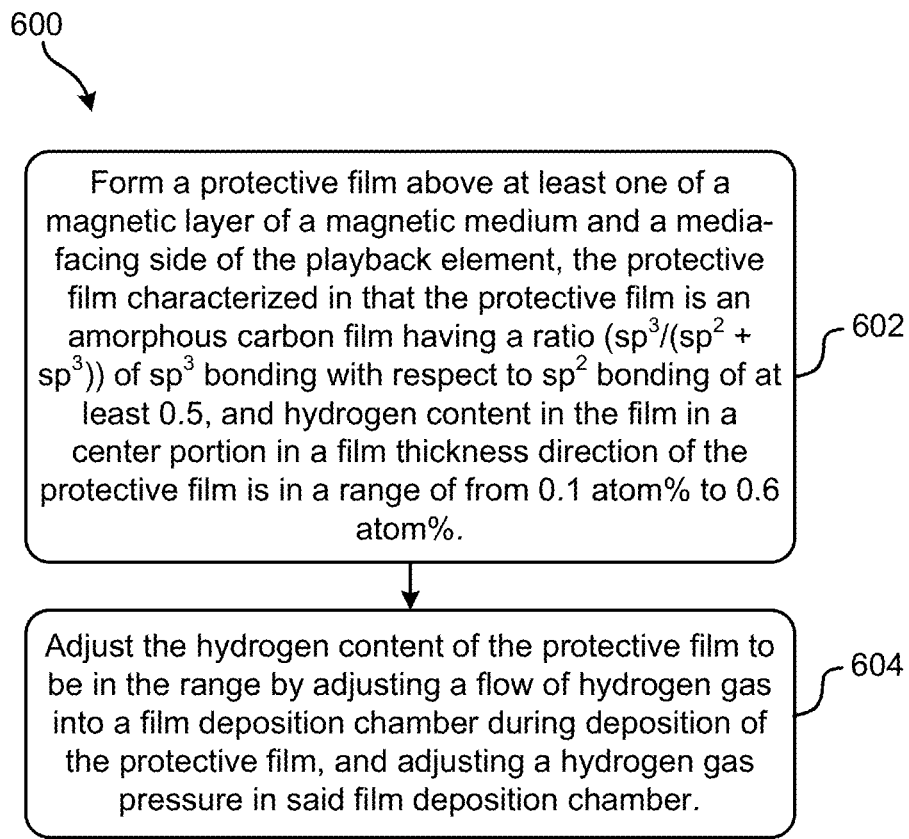
FIG. 6 is a process flowchart for a method according to one embodiment.

FIG. 6 depicts a method 600 for forming an overcoat, in accordance with one embodiment. As an option, the present method 600 may be implemented in conjunction with features from any other embodiment listed herein, such as those described with reference to the other FIGS. Of course, however, such method 600 and others presented herein may be used in various applications and/or in permutations which may or may not be specifically described in the illustrative embodiments listed herein. Further, the method 600 presented herein may be used in any desired environment.

Referring now to FIG. 6, the method 600 includes forming an overcoat above at least one of a magnetic layer of a magnetic medium and a media-facing side of the playback element, the overcoat characterized in that the overcoat is an amorphous carbon film having a ratio of $sp^3$ bonding with respect to $sp^2$ bonding ($sp^3/(sp^2+sp^3)$) of at least 0.5, and hydrogen content in the film in a center layer in a film thickness direction of the overcoat is in a range of from 0.1 atom % to 0.6 atom %. See operation 602.

Referring to operation 604, the hydrogen content of the overcoat is adjusted to be in the preferred range by adjusting a flow of hydrogen gas into a film deposition chamber during deposition of the overcoat, and by adjusting a hydrogen gas pressure in the film deposition chamber. In a preferred approach, when the overcoats are formed, the hydrogen gas pressure in the film deposition chamber may be specified to be in the range from about $3.0 \times 10^{-2}$ Pa to about $6.0 \times 10^{-2}$ Pa, more preferably, in the range from about $4.5 \times 10^{-2}$ Pa to about $5.5 \times 10^{-2}$ Pa, but could be higher or lower depending on the desired embodiment.

According to an illustrative example, which is in no way intended to limit the invention, the hydrogen content in the film may be measured by high-resolution elastic recoil detection analysis (HR-ERDA), a highly sensitive recoil particle detection method for hydrogen analysis, which targets hydrogen from the elastic recoil detection. Corresponding manufacturing methods for forming the overcoats for the magnetic recording medium and the magnetic head may adjust the hydrogen content in the overcoat to a preferred hydrogen-content range as described above. According to one approach, the manufacturing methods may adjust the hydrogen content by adjusting the flow of hydrogen gas supplied from the outside into the film deposition chamber during film deposition, and adjusting the hydrogen gas pressure in the film deposition chamber.

According to various approaches, the manufacturing method of the superhard amorphous carbon film is not particularly limited and may be a method capable of adjusting the hydrogen content within a range of extremely small amounts, preferably within the ranges described above. According to one approach, this may be possible by including an extremely small amount of hydrogen in the carbon film by supplying a small amount of hydrogen gas into the film deposition chamber during film deposition. Moreover, the film may be formed by various methods, including, but not limited to a filtered cathodic vacuum arc (FCVA) method, which may be used form a superhard amorphous carbon film having a low number of particles by including a magnetic field filter.

Without wishing to limit the scope of the invention, illustrative working examples are explained below, which correspond to the characteristics of an about 2.5 nm thick superhard amorphous carbon film that includes an small amount (e.g., from about 0.1 atom % to about 0.6 atom %) of hydrogen in the film. As described above, the small about of hydrogen in the film may be achieved by supplying an extremely small amount of hydrogen gas into a film deposition chamber during film deposition, and the manufacturing method thereof.

According to the first working example, which again is in no way intended to limit the invention, a superhard amorphous carbon film having a film thickness of about 2.5 nm was formed on a Si monocrystalline substrate. The amount of hydrogen gas supplied to the interior of a film deposition chamber was varied, and the film density and film hardness were evaluated with respect to the hydrogen content in the film. According to various approaches, the substrate may include a chemically hardened glass substrate, a substrate with the surface polished after plating e.g., Ni—P on an aluminum alloy substrate, etc. Moreover, the shape of the substrate can be freely selected, depending on the desired embodiment.

Figure 7:
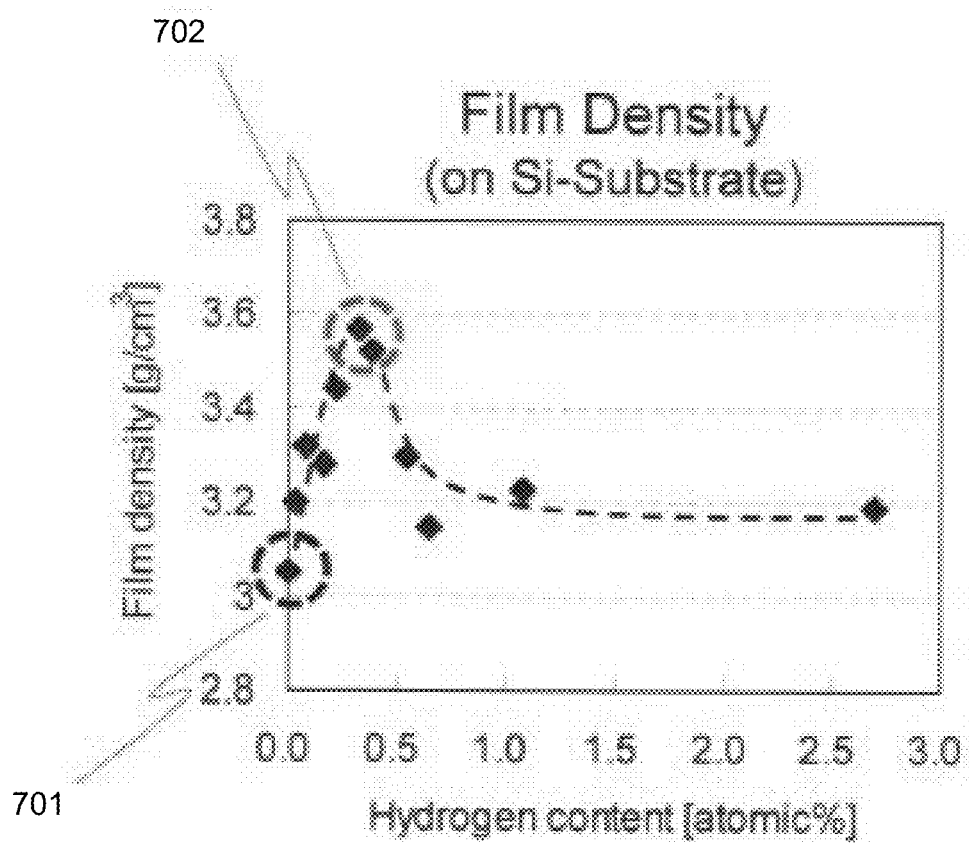
FIG. 7 is a graph showing the measurement results of the film density with respect to the hydrogen content in the film according to one embodiment.

With continued reference to the first working example the film density was measured by X-ray reflectometry. The resulting measurements are shown in the graph of FIG. 7, where the horizontal axis represents the hydrogen content in the film and the vertical axis represents the film density. According to this results depicted in FIG. 7, the film density improves in the region where the hydrogen content in the film is from about 0.1 atom % to about 0.6 atom %. Furthermore, the film density improves by approximately 20% in region 702 where the hydrogen content is from about 0.2 atom % to about 0.4 atom %, compared to a conventional film of region 701 formed without supplying hydrogen.

Figure 8:
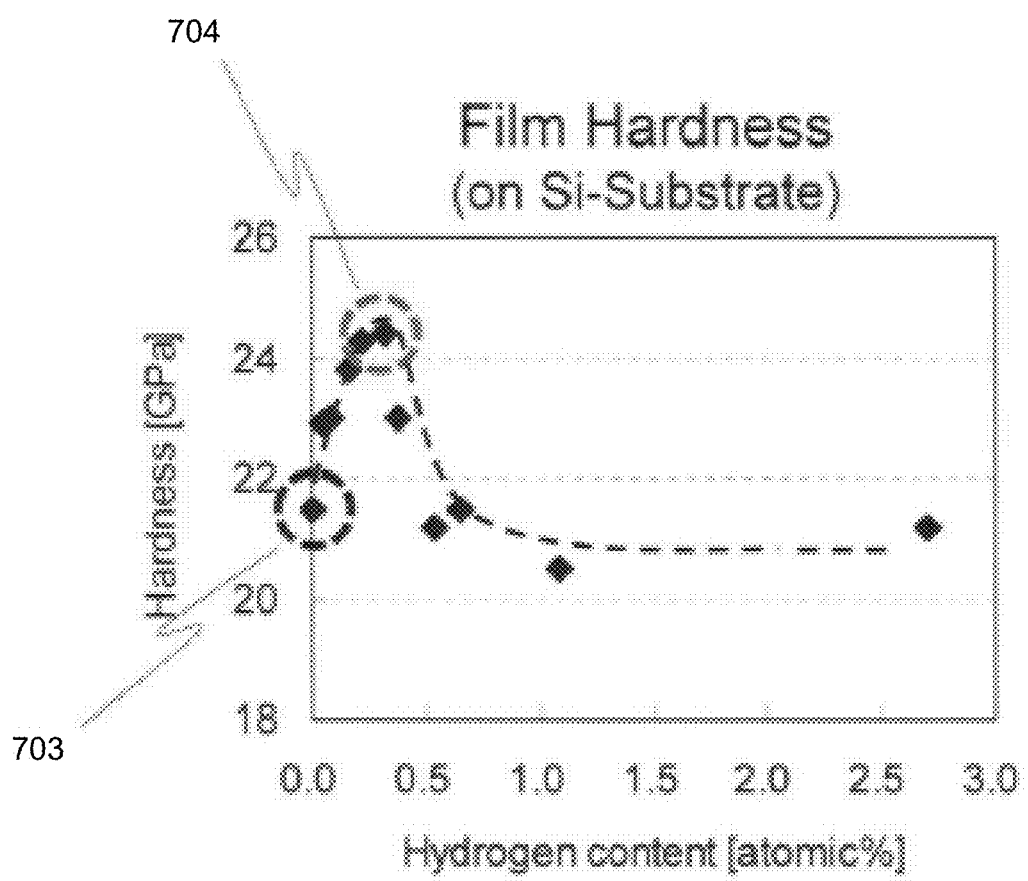
FIG. 8 is a graph showing the measurement results of the film hardness with respect to the hydrogen content in the film according to one embodiment.

Referring now to FIG. 8 the measurements of the film hardness, measured by incorporating a nanoindenter method, are shown. In the graph depicted in FIG. 8, the horizontal axis represents the hydrogen content in the film and the vertical axis represents the film hardness. According to the result shown in the graph, in a region where the hydrogen content in the film is from about 0.1 atom % to about 0.6 atom %, the film hardness improves similarly to that of the film density depicted in FIG. 7. Furthermore, the film hardness improves by approximately 10% in region 704 where the hydrogen content is from about 0.2 atom % to about 0.4 atom %, compared to that of a conventional film 703 formed without supplying hydrogen.

According to a second working example, a similar film structure as used in the first working example was used; however, three samples having different hydrogen content in the film (0 atom %, 0.3 atom %, 2.5 atom %) were fabricated. The samples were heated by a hot plate set to the temperature of 500° C., and the residual film thickness of the carbon film was measured with respect to the heating time.

Figure 9:
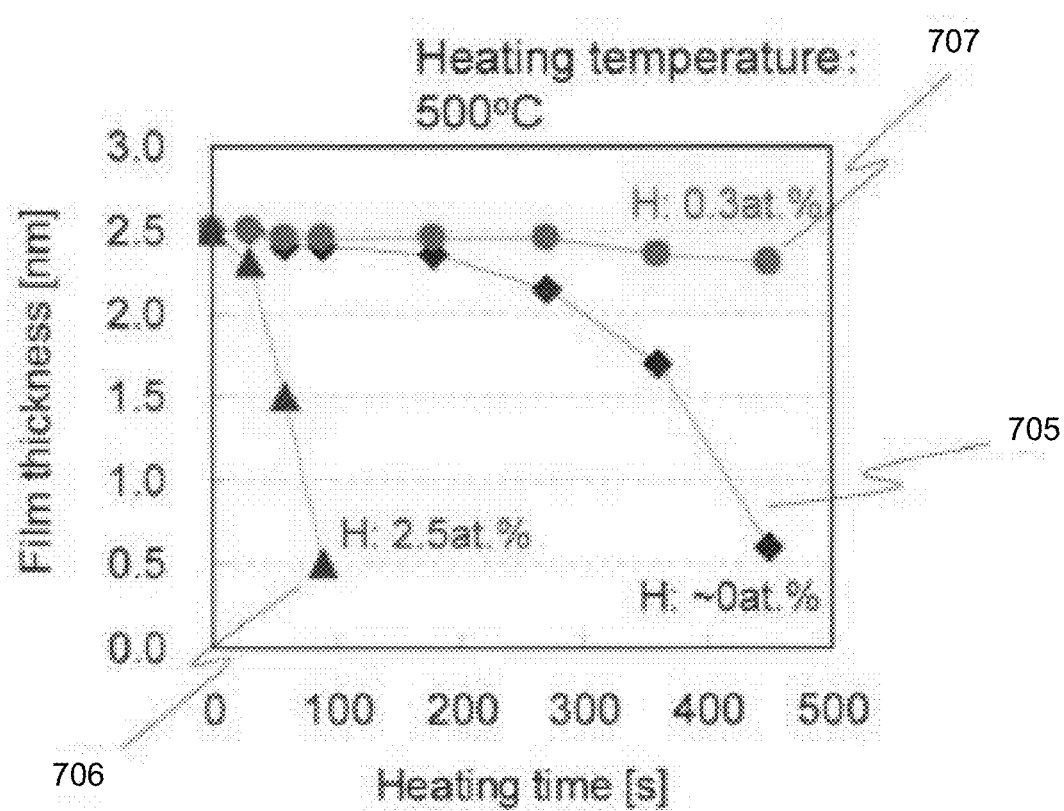
FIG. 9 is a graph showing the measurement results of the residual film thickness of the carbon film with respect to the heating time according to one embodiment.

FIG. 9 shows the measurements of the changes in the film thickness, wherein spectroscopic ellipsometry was used to measure the film thickness. Moreover, high-resolution elastic recoil particle detection for analyzing hydrogen (HR-ERDA) was included to measure the hydrogen content of the working example. With reference to the graph of FIG. 9, the horizontal axis represents the heating time and the vertical axis represents the film thickness. According to the results shown in FIG. 9, for samples having a hydrogen content in the film of 0 atom % 705 and 2.5 atom % 706, for the heating times of 100 seconds and 450 seconds respectively, the film thickness is seen to decrease by approximately 80%. In contrast, for the heating time of 450 seconds, a sample having 0.3 atom % 707 has a decrease in the film thickness of less than 10% and strong thermal resistance.

From the above results, it is apparent that the carbon film in a region having hydrogen content in the film from about 0.1 atom % to about 0.6 atom % has strong thermal resistance compared to carbon film having hydrogen content outside of the above range. Therefore, according to a preferred approach, this film may be the overcoat for the magnetic recording medium and the magnetic head for energy-assisted magnetic recording having heat generated on the magnetic recording medium and the magnetic head. For example, this film may be the overcoat in thermally assisted magnetic recording that provides thermal energy to the magnetic recording medium from the magnetic head during recording to facilitate writing or in microwave assisted magnetic recording that applies a high-frequency AC magnetic field to facilitate writing.

According to a third working example, which again is in no way intended to limit the invention, a superhard amorphous carbon film having a film thickness of about 2.5 nm was formed on a Si monocrystalline substrate and on a glass substrate with a deposited magnetic recording layer to evaluate the hydrogen concentration in the carbon film. According to the graph depicted in FIG. 10, three superhard amorphous carbon films 708, 709, 710 having different amounts of hydrogen gas supplied to the interior of the film deposition chamber when being formed, and a film 711 formed by a CVD method were evaluated.

Figure 10:
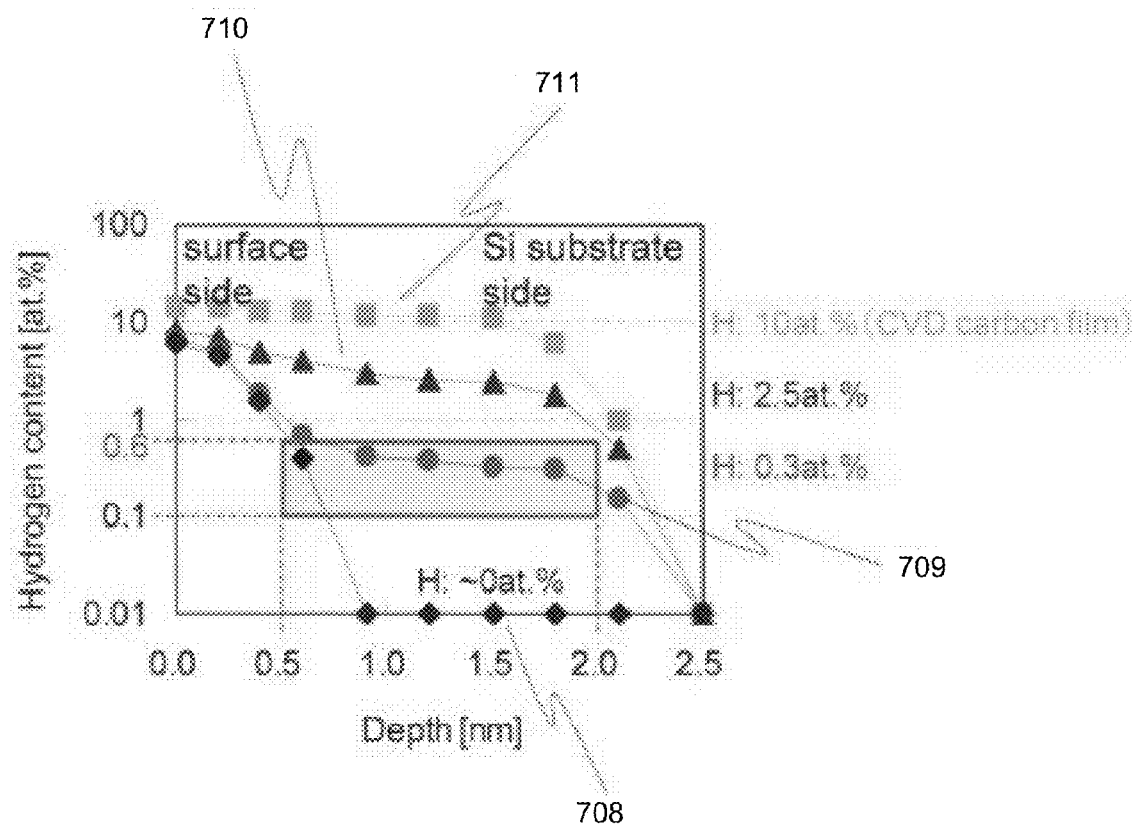
FIG. 10 is a graph showing the measurement results of the hydrogen content of a superhard amorphous carbon film according to one embodiment.

FIG. 10 shows the measurements of the hydrogen content in the carbon film on a Si substrate wherein the horizontal axis represents the depth from the top surface of the overcoat, and the vertical axis represents the hydrogen content. Moreover, the depth was measured by high-resolution elastic recoil detection analysis for hydrogen analysis (HR-ERDA) and by high-resolution Rutherford backscattering spectrometry (HRRBS).

With continued reference to the graph of FIG. 10, in the region at a depth of 0.5 nm from the top surface, the components in the air are absorbed by the top surface when extracted from the vacuum deposition chamber. In addition, in the 0.5 nm region on the Si substrate side, by forming a mixed layer of the carbon film and the top surface layer of the Si substrate, there is a distribution of hydrogen content in the depth direction. In a region excluding the 0.5 nm layer on the top surface of the overcoat thickness and the 0.5 nm layer on the substrate side, hydrogen content in the film is nearly constant.

Figure 11B:
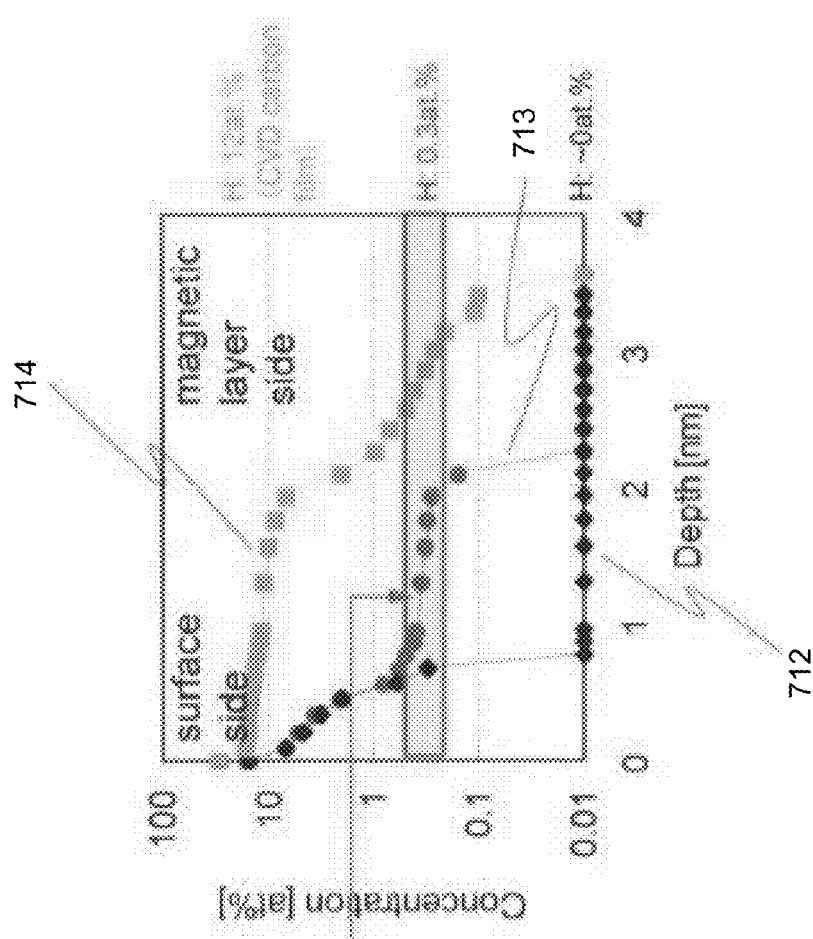
FIG. 11B is a detailed view of the graph in FIG. 11A, showing the measurement results of the hydrogen content of superhard amorphous carbon film according to one embodiment.
Figure 11A:
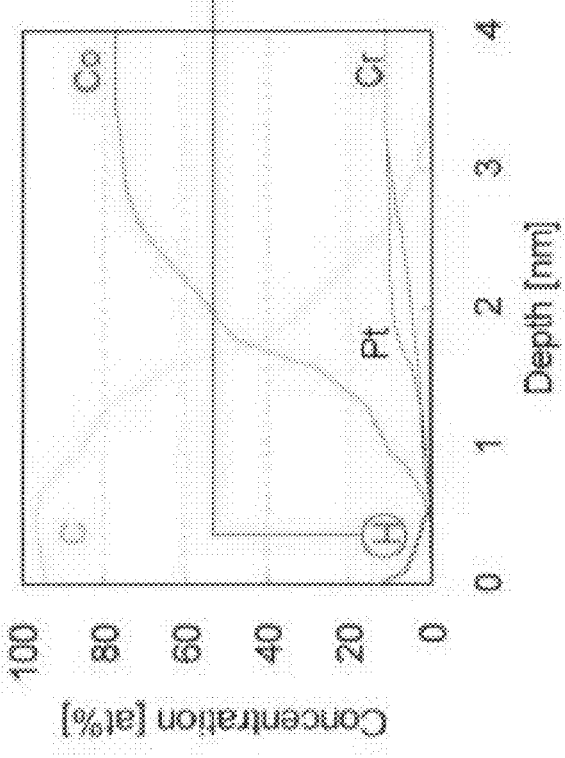
FIG. 11A is a graph showing the measurement results of the hydrogen content of several superhard amorphous films according to one embodiment.

Referring now to FIGS. 11A-11B, the measurements of the hydrogen content in the carbon film on the glass substrate formed with a deposited magnetic recording layer are shown in the graphs. The horizontal axis of the graphs represents the depth from the top surface of the overcoat wherein the vertical axis represents the element concentration. Moreover, three superhard amorphous carbon films 712, 713, 714 having different amounts of hydrogen gas supplied to the interior of the film deposition chamber when being formed; film 714 being formed by a CVD method were evaluated.

Similar to the evaluation results of the Si substrate depicted in FIG. 10, the hydrogen content has a distribution in the depth direction of the film thickness. In the region excluding the 0.5 nm layer on the top surface side of the overcoat thickness and the 0.5 nm layer on the substrate side, the hydrogen content in the film is nearly a constant value. When the results of the first and second working examples are combined, in the region excluding the 0.5 nm layer on the top surface side of the overcoat thickness and the 0.5 nm layer on the substrate side, the film characteristic is determined by the average value of the hydrogen content in the film. In addition, the hydrogen content in the film is monitored and can be appropriately controlled to be within the tolerance (0.1 atom % to 0.6 atom %).

According to one embodiment, the overcoat is suitable for controlling an extremely small hydrogen concentration when composed of superhard amorphous carbon film using a physical vapor deposition means utilizing carbon ions. According to various approaches, the superhard amorphous carbon film may be formed by incorporating ion beam vapor deposition methods, low gas pressure-high current sputtering methods, etc. or other methods which would be apparent to one skilled in the art upon reading the present description.

Figure 12:
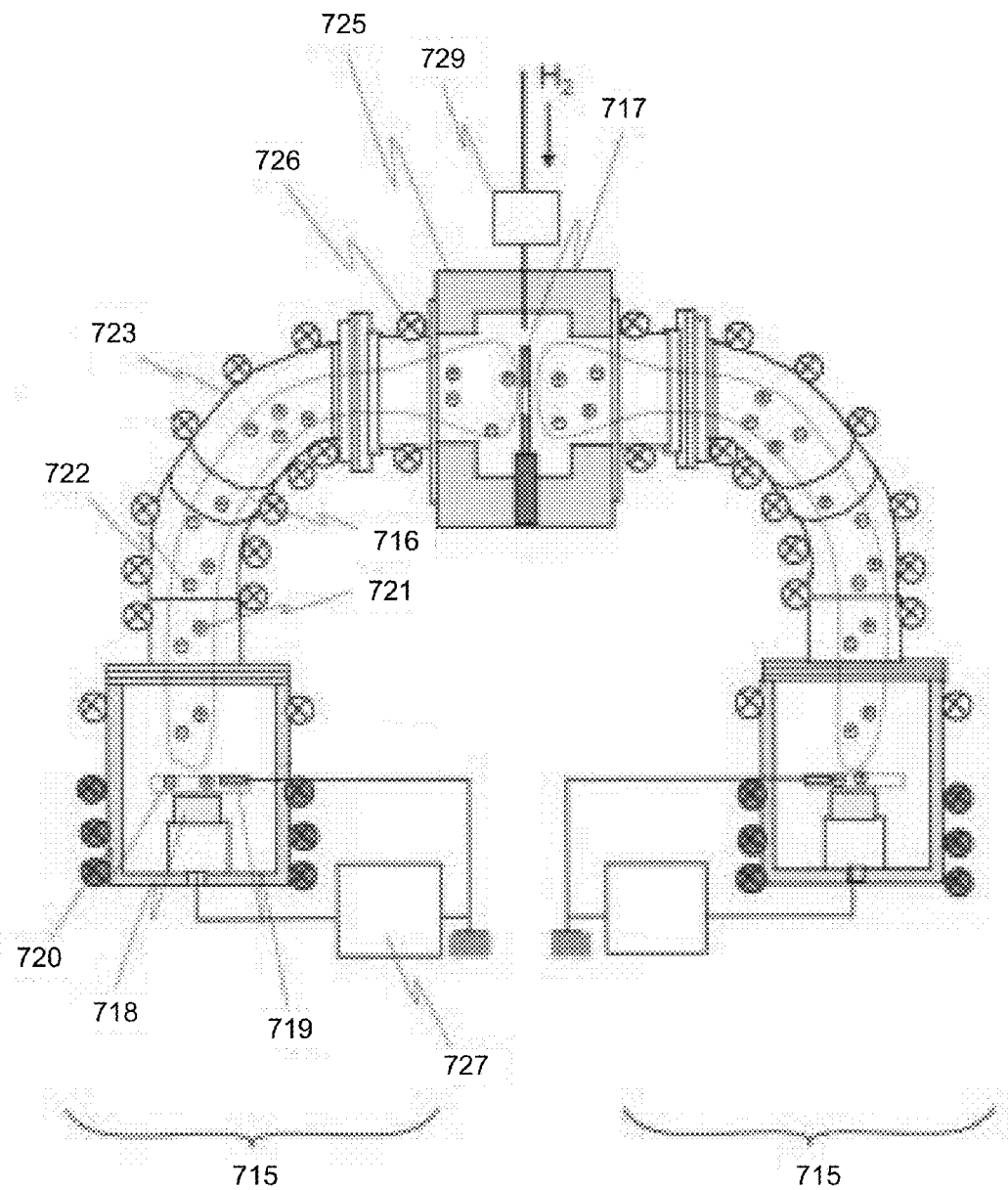
FIG. 12 is a schematic diagram of a vapor deposition tool using arc discharge according to one embodiment.

In an illustrative embodiment, which is in no way intended to limit the invention, a vapor deposition device as shown in FIG. 12 may be used to form overcoats using an arc discharge. As depicted in FIG. 12, a plasma beam 716 formed by an arc discharge unit 715 is used as an ion source (explained in further detail below). A plasma beam 716 is generated from an arc discharge unit 715 arranged to enable the processing of both surfaces of the magnetic disk substrate 717 being processed. Specifically, a voltage, from a voltage source 727, is applied between a cathode 718 and an anode 719 composed of carbon to generate an arc discharge 720 in a high vacuum atmosphere.

As a result, the cathode 718 enters an extremely high temperature state similar to arc welding and plasma (e.g., a state generating positively charged carbon ions 721 and electrons 722) is generated from the cathode surface. In addition, the arc current in the cathode 718 flows in at approximately 50 amperes and generates an arc discharge with an arc voltage of approximately −20 volts. The generated carbon ions 721 and electrons 722 pass through a curved magnetic field duct 723 for removing the droplets generated during the arc discharge and for transporting the plasma, are introduced into a film deposition chamber 725 holding the magnetic disk substrate 717 being processed, and are uniformly radiated on the magnetic disk substrate 717 being processed by a scanning electromagnet 726. Moreover, the magnetic disk substrate 717 being processed is electrically floated.

The incident carbon ions are applied at an energy of approximately 50 eV, and the plasma beam 716 irradiates carbon ions 721 and electrons 722 for overall neutrality. Because only the cathode 718 composed of carbon is used, a superhard amorphous carbon film containing almost no hydrogen is formed. In this working example, the magnetic disk substrate 717 being processed was electrically floated, but is not restricted to this, and is not a problem in a vapor deposition method that applies a substrate bias.

With continued reference to FIG. 12, when the plasma beam 716 irradiates an unprocessed magnetic disk substrate 717, hydrogen gas is supplied from the outside into the film deposition chamber 725. In this case, by using a mass flow controller 729 to adjust the supplied amount of hydrogen gas, the hydrogen pressure in the film deposition chamber 725 is held at the specified pressure, and the hydrogen content in the superhard amorphous carbon film can be adjusted to the desired value.

According to a preferred approach, the hydrogen gas pressure in the film deposition chamber 725 may be in the range from about $3.0 \times 10^{-2}$ Pa to about $6.0 \times 10^{-2}$ Pa, but could be higher or lower depending on the desired embodiment. The supplied hydrogen gas is excited by the plasma beam 716 to generate hydrogen radicals, wherein the radicals bond to dangling bonds of carbon caused by disorder in the structure. Moreover, this may be caused by the radicals being taken into the superhard amorphous carbon film. As a result the film density, film hardness, and thermal resistance may be high, thereby achieving a more chemically stable state. Although the hydrogen gas was supplied into the film deposition chamber 725 for the illustrative embodiment depicted in FIG. 12, according to another approach, the gas may be supplied to a location other than the film deposition chamber 725, such as where the hydrogen gas can be excited by the plasma beam 716.

It should be noted that methodology presented herein for at least some of the various embodiments may be implemented, in whole or in part, in computer hardware, software, by hand, using specialty equipment, etc. and combinations thereof. In one illustrative approach, a magnetic recording device may be included in a magnetic recording medium and/or magnetic head according to any of the embodiments described and/or suggested herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
   at least a ground layer above a non-magnetic substrate;
   a magnetic recording layer above the ground layer; and
   an overcoat above the magnetic recording layer, the overcoat characterized in that
   said overcoat is an amorphous carbon film having a ratio of $sp^3$ bonding with respect to $sp^2$ bonding ($sp^3/(sp^2+sp^3)$) of at least 0.5, and hydrogen content in the overcoat in a center layer thereof in a film thickness direction of said overcoat is from 0.1 atom % to 0.6 atom %.

2. The magnetic recording medium as recited in claim 1, wherein the center layer of the overcoat is defined between a first layer and a second layer of the overcoat, the first layer extending at least 0.5 nm in the film thickness direction from a side thereof closest the recording layer in the film thickness direction, and a second layer extending at least 0.5 nm in the film thickness direction from a side thereof opposite the first layer.

3. The magnetic recording medium as recited in claim 2, wherein the first and second layers have a composition different than the center layer.

4. The magnetic recording medium as recited in claim 1, wherein the amorphous carbon is primarily tetrahedral amorphous carbon.

5. The magnetic recording medium as recited in claim 1, wherein the center layer has a carbon content of at least 95 atom %.

6. The magnetic recording medium as recited in claim 1, wherein a mass density of the overcoat is in a range of 3.3 g/cm$^3$ to 3.6 g/cm$^3$ as determined by x-ray reflectometry.

7. The magnetic recording medium as recited in claim 1, wherein a mass density of the overcoat is in a range of 3.5 g/cm$^3$ to 3.6 g/cm$^3$ as determined by x-ray reflectometry.

8. The magnetic recording medium as recited in claim 1, wherein hydrogen content in the overcoat in a center layer thereof in a film thickness direction of said overcoat is from 0.2 atom % to 0.4 atom %.

9. A magnetic data storage system, comprising:
   at least one magnetic head;
   a magnetic medium as recited in claim 1;
   a drive mechanism for passing the magnetic medium over the at least one magnetic head; and
   a controller electrically coupled to the at least one magnetic head for controlling operation of the at least one magnetic head.

10. A magnetic head, comprising:
    a playback element; and
    an overcoat above a media-facing side of the playback element, the overcoat characterized in that said overcoat is an amorphous carbon film having a ratio of $sp^3$ bonding with respect to $sp^2$ bonding ($sp^3/(sp^2+sp^3)$) of at least 0.5, and hydrogen content in the film in a center layer in a film thickness direction of said overcoat is from 0.1 atom % to 0.6 atom %.

11. The magnetic head as recited in claim 10, wherein the center layer of the overcoat is defined between a first layer and a second layer of the overcoat, the extending at least 0.5 nm in the film thickness direction from a side thereof closest the playback element in the film thickness direction, and a second layer extending at least 0.5 nm in the film thickness direction from a side thereof opposite the first side.

12. The magnetic head as recited in claim 11, wherein the first and second layers have a composition different than the center layer.

13. The magnetic head as recited in claim 10, wherein the amorphous carbon is primarily tetrahedral amorphous carbon.

14. The magnetic head as recited in claim 10, wherein the center layer has a carbon content of at least 95 atom %.

15. The magnetic head as recited in claim 10, wherein a mass density of the overcoat is in a range of 3.3 g/cm$^3$ to 3.6 g/cm$^3$ as determined by x-ray reflectometry.

16. The magnetic head as recited in claim 10, wherein a mass density of the overcoat is in a range of 3.5 g/cm$^3$ to 3.6 g/cm$^3$ as determined by x-ray reflectometry.

17. The magnetic head as recited in claim 10, wherein hydrogen content in the overcoat in a center layer thereof in a film thickness direction of said overcoat is from 0.2 atom % to 0.4 atom %.

18. A magnetic data storage system, comprising:
- at least one magnetic head as recited in claim 10;
- a magnetic medium;
- a drive mechanism for passing the magnetic medium over the at least one magnetic head; and
- a controller electrically coupled to the at least one magnetic head for controlling operation of the at least one magnetic head.

19. A method, comprising:
forming an overcoat above at least one of a magnetic layer of a magnetic medium and a media-facing side of the playback element, the overcoat characterized in that said overcoat is an amorphous carbon film having a ratio of sp$^3$ bonding with respect to sp$^2$ (sp$^3$/(sp$^2$+sp$^3$)) bonding of at least 0.5, and hydrogen content in the film in a center layer in a film thickness direction of said overcoat is in a range of from 0.1 atom % to 0.6 atom %,
wherein the hydrogen content of said overcoat is adjusted to be in said range by adjusting a flow of hydrogen gas into a film deposition chamber during deposition of the overcoat, and by adjusting a hydrogen gas pressure in said film deposition chamber.

20. The method as recited in claim 19, wherein the hydrogen gas pressure in the film deposition chamber when said overcoat is formed is in a range from $3.0 \times 10^{-2}$ Pa to $6.0 \times 10^{-2}$ Pa.

21. The method as recited in claim 19, wherein the hydrogen gas pressure in the film deposition chamber when said overcoat is formed is in a range from $4.5 \times 10^{-2}$ Pa to $5.5 \times 10^{-2}$ Pa.

* * * * *